United States Patent
Liu et al.

(10) Patent No.: US 9,479,253 B2
(45) Date of Patent: Oct. 25, 2016

(54) OPTICAL COMMUNICATION DEVICE AND OPTICAL COMMUNICATION METHOD

(71) Applicant: Industrial Technology Research Institute, Chutung, Hsinchu County (TW)

(72) Inventors: Tze-An Liu, Chutung (TW); Po-Er Hsu, Chutung (TW); Hsin-Feng Chen, Chutung (TW)

(73) Assignee: Industrial Technology Research Institute, Chutung (TW)

( * ) Notice: Subject to any disclaimer, the term of this patent is extended or adjusted under 35 U.S.C. 154(b) by 0 days.

(21) Appl. No.: 14/583,956

(22) Filed: Dec. 29, 2014

(65) Prior Publication Data

US 2016/0087724 A1 Mar. 24, 2016

(30) Foreign Application Priority Data

Sep. 19, 2014 (TW) .............................. 103132407 A

(51) Int. Cl.
*H04B 10/00* (2013.01)
*H04B 10/2575* (2013.01)
*H04B 10/50* (2013.01)
*H04J 14/02* (2006.01)

(52) U.S. Cl.
CPC ...... *H04B 10/25752* (2013.01); *H04B 10/504* (2013.01); *H04B 10/506* (2013.01); *H04J 14/02* (2013.01)

(58) Field of Classification Search
USPC .................................................. 398/115–131
See application file for complete search history.

(56) References Cited

U.S. PATENT DOCUMENTS 6,389,197 B1    5/2002  Iltchenko et al.
6,473,218 B1   10/2002  Maleki et al.
6,724,523 B2 *  4/2004  Yap .................. H04B 10/25752
                                                        330/3
6,724,783 B2 *  4/2004  Jalali .................... H04B 10/503
                                                        372/25

(Continued)

FOREIGN PATENT DOCUMENTS

CN    101873172 A    10/2010
CN    102546078 A    7/2012

(Continued)

OTHER PUBLICATIONS

Del'Haye et al., "Optical frequency comb generation from a monolithic microresonator," *Nature*, 450:1214-1217 (2007).

(Continued)

*Primary Examiner* — Agustin Bello
(74) *Attorney, Agent, or Firm* — McCarter & English, LLP; Yu Lu

(57) ABSTRACT

An optical communication device and an optical communication method are provided. The optical communication device includes a laser source, an optical amplifier, and an optical signal generating chip. The laser source generates a laser beam. The optical amplifier is coupled to the laser source and amplifies light intensity of the laser beam in a specific wavelength band. The optical signal generating chip includes a micro-resonator and a modulation module. The micro-resonator is coupled to the optical amplifier and generates a multi-wavelength frequency comb according to the amplified laser beam. The modulation module is coupled to the micro-resonator and modulates a communication signal set to generate a plurality of optical modulated signals according to the multi-wavelength frequency comb.

16 Claims, 7 Drawing Sheets

(56) References Cited

U.S. PATENT DOCUMENTS

| | | | |
|---|---|---|---|
| 6,791,734 B2* | 9/2004 | Izadpanah | H01Q 3/2676 330/276 |
| 6,795,481 B2 | 9/2004 | Maleki et al. | |
| 6,873,631 B2 | 3/2005 | Yao et al. | |
| 7,020,396 B2* | 3/2006 | Izadpanah | H01Q 3/2676 398/115 |
| 7,085,499 B2* | 8/2006 | Yap | G02B 6/2861 398/161 |
| 7,486,853 B2 | 2/2009 | Cunningham et al. | |
| 7,545,843 B2 | 6/2009 | Armani et al. | |
| 7,561,807 B2* | 7/2009 | Doerr | H04B 10/60 359/326 |
| 7,603,037 B2* | 10/2009 | Sayyah | H04B 10/25752 398/183 |
| 7,650,080 B2* | 1/2010 | Yap | G02F 2/02 398/161 |
| 7,684,664 B2 | 3/2010 | Digonnet et al. | |
| 7,783,199 B2* | 8/2010 | Ridgway | G01S 7/03 398/115 |
| 7,991,025 B2 | 8/2011 | Maleki et al. | |
| 8,265,488 B2* | 9/2012 | Davies | H04B 10/2575 398/128 |
| 8,520,988 B2 | 8/2013 | Digonnet et al. | |
| 9,031,412 B2* | 5/2015 | Nagarajan | B82Y 20/00 398/196 |
| 2003/0202801 A1* | 10/2003 | Izadpanah | H01Q 3/2676 398/200 |
| 2004/0018018 A1* | 1/2004 | Izadpanah | F16K 37/0075 398/77 |
| 2005/0018724 A1* | 1/2005 | Da Silva | H04B 10/572 372/32 |
| 2005/0249509 A1* | 11/2005 | Nagarajan | B82Y 20/00 398/198 |
| 2008/0089698 A1* | 4/2008 | Jiang | H04B 10/505 398/189 |
| 2008/0107430 A1* | 5/2008 | Jackel | H04J 14/005 398/188 |
| 2010/0166424 A1* | 7/2010 | Nagarajan | B82Y 20/00 398/79 |
| 2010/0187208 A1* | 7/2010 | Dantus | G01J 11/00 219/121.72 |
| 2014/0003810 A1* | 1/2014 | Dong | G02F 1/011 398/48 |
| 2014/0064734 A1* | 3/2014 | Witzens | H04B 10/64 398/79 |

FOREIGN PATENT DOCUMENTS

| | | |
|---|---|---|
| TW | 368404 | 9/1999 |
| TW | 487812 | 5/2002 |
| TW | I371895 | 9/2012 |
| TW | 201305632 | 2/2013 |

OTHER PUBLICATIONS

Del'Haye et al., "Laser-machined ultra-high-Q microrod resonators for nonlineaor optics," *Appl. Phys. Letts.*, 102:221119-1-221119-4 (2013).

Grudinin et al., "Generation of optical frequency combs with a $CaF_2$ resonator," *Optics Letters*, 34(7):878-880 (2009).

Johnson et al., "Chip-based frequency combs with sub-100 GHz repetition rates," *Optics Letters*, 37(5):875-877 (2012).

Levy et al., "CMOS-compatible multiple-wavelength oscillator for on-chip optical interconnects," *Nature Photonics*, 4:37-40 (2010).

Papp and Diddams, "Spectral and temporal characterization of a fused-quartz microresonator optical frequency comb," *Phys. Rev.*, 7 pages (2011).

Turner et al., "Ultra-low power parametric frequency conversion in a silicon microring resonator," *Optics Express*, 16(7):4881-4887 (2008).

Zhang et al., "Multi-service, Multi-band, and MIMO Data Distribution over 60-GHz RoF System for Gigabit Wireless Local Area Networks," *ACP Tec. Digest*, 3 pages (2012).

Taiwanese Office Action issued on Mar. 15, 2016 in Taiwan Patent Application No. 103132407.

* cited by examiner

OPTICAL COMMUNICATION DEVICE AND OPTICAL COMMUNICATION METHOD

CROSS-REFERENCE TO RELATED APPLICATION

This application claims foreign priority under 35 U.S.C. §119(a) to Patent Application No. 103132407, filed on Sep. 19, 2014, in the Intellectual Property Office of Ministry of Economic Affairs, Republic of China (Taiwan, R.O.C.), the entire content of which Patent Application is incorporated herein by reference.

TECHNICAL FIELD

The technical field is related to an optical communication device and an optical communication method.

BACKGROUND OF THE INVENTION

The data traffic amount grows along with the growing development of mobile Internet and multi-media applications. It is going to be an era of fourth generation (4G) communication. For the placement of 4G base stations, in addition to the consideration of the coverage areas of the large base stations, small equipment may be used to extend the coverage areas of the base stations in some areas where the signal quality is not good or in some areas which is not suitable for the placement of large base stations, such as tunnels or inside a building. One of the technologies to implement is radio over fiber (RoF), by which signals are transmitted over an optical fiber. The RoF technology could extend the coverage areas easily, be simple to implement, and be with low cost. Therefore, when the operators place base stations, 4G RoF solution may be used to enlarge the coverage areas and solve the problems such as environments where signal quality is poor or high data traffic.

There are two main systems, Worldwide Interoperability for Microwave Access (WiMAX) and Long Term Evolution (LTE), for 4G communication. In addition, the operators often provide Wi-Fi hotspots to support large data traffic in crowded places. Therefore, there is a need for 4G RoF systems to support multiple systems. Nowadays, the operators place one RoF equipment for each system, which increases the cost and space to place the equipment.

SUMMARY OF THE INVENTION

The disclosure provides an optical communication device and an optical communication method.

The disclosure provides an optical communication device. The optical communication device includes a laser source, an optical amplifier, and an optical signal generating chip. The laser source generates a laser beam. The optical amplifier is coupled to the laser source and amplifies light intensity of the laser beam in a specific wavelength band. The optical signal generating chip includes a micro-resonator and a modulation module. The micro-resonator is coupled to the optical amplifier and generates a multi-wavelength frequency comb according to the amplified laser beam. The modulation module is coupled to the micro-resonator and modulates a communication signal set to generate a plurality of optical modulated signals according to the multi-wavelength frequency comb.

The disclosure provides an optical communication method. The optical communication method includes the following steps of: generating a laser beam; amplifying light intensity of the laser beam in a specific wavelength band; generating a multi-wavelength frequency comb by an optical signal generating chip according to the amplified laser beam, wherein the optical signal generating chip is inside the optical communication device; and modulating a communication signal set to generate a plurality of optical modulated signals by the optical signal generating chip according to the multi-wavelength frequency comb.

Several embodiments accompanied with figures are described below for further understandings.

BRIEF DESCRIPTION OF THE DRAWINGS

The present disclosure could be more fully understood by reading the following detailed description of the preferred embodiments, with reference made to the accompanying drawings.

DETAILED DESCRIPTION OF THE INVENTION

The term "couple" or "coupled" used in the disclosure and the claims may refer to any direct or indirect connection. For example, when describing a first device coupled to a second device, the first device may be connected to the second device directly, or the first device may be connected to the second device indirectly through any other devices, methods, or connection techniques.

Figure 1:
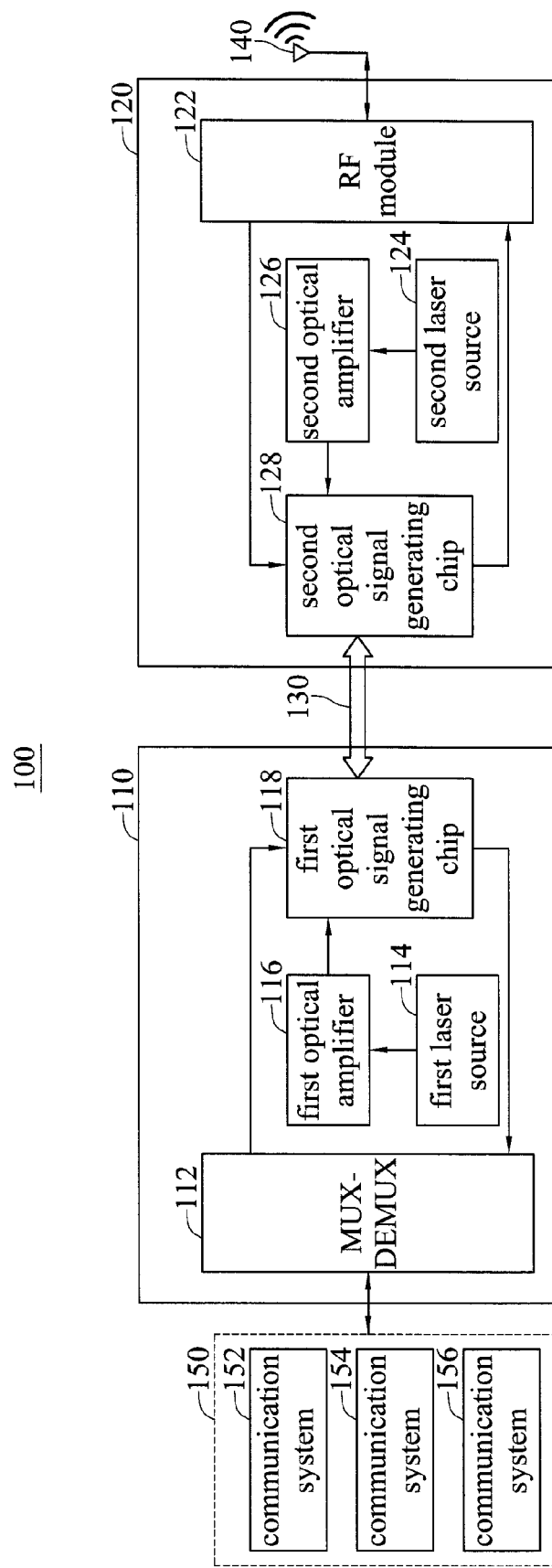
FIG. 1 is a diagram showing an optical communication system in accordance with an embodiment of the disclosure.

FIG. 1 is a diagram showing an optical communication system 100 in accordance with an embodiment of the disclosure. The optical communication system 100, for example, is a radio-over-fiber (RoF) communication system which supports a plurality of communication systems. The optical communication system 100 includes a head-end unit (HEU) 110 and a remote access unit (RAU) 120. The head-end unit 110 may be an optical communication device. The head-end unit 110 includes a multiplexer-demultiplexer (MUX-DEMUX) 112, a first laser source 114, a first optical amplifier 116, and a first optical signal generating chip 118. The MUX-DEMUX 112 is coupled to the first optical signal generating chip 118. The first laser source 114 is coupled to the first optical amplifier 116. The first optical amplifier 116 is coupled to the first laser source 114 and the first optical signal generating chip 118. The first optical signal generating chip 118 is coupled to the first optical amplifier 116 and the MUX-DEMUX 112. The remote access unit 120 may be an optical communication device. The remote access unit 120 includes a radio frequency (RF) module 122, a second laser source 124, a second optical amplifier 126, and a second optical signal generating chip 128. The RF module 122 is coupled to the second optical signal generating chip 128. The second laser source 124 is coupled to the second optical amplifier 126. The second optical amplifier 126 is coupled to the second laser source 124 and the second optical signal generating chip 128. The second optical signal generating chip 128 is coupled to the second optical amplifier 126 and the RF module 122. The first laser source 114 may be a laser diode (LD). The second laser source 124 may be a laser diode. The laser diode, for example, is a distributed feedback laser (DFB laser). The MUX-DEMUX 112 includes a multiplexer and a demultiplexer. The multiplexer and the demultiplexer may be implemented in a single module, circuit, device, or chip. The multiplexer and the multiplexer may also be implemented in separate modules, circuits, devices, or chips. The first optical signal generating chip 118 may be a silicon (Si) chip. The second optical signal generating chip 128 may be a silicon chip. A silicon chip may be made from a silicon substrate through related manufacturing process. An optical fiber 130 or another similar medium may be served as a medium for transmitting optical communication signals between the first optical signal generating chip 118 and the second optical signal generating chip 128.

Figure 2:
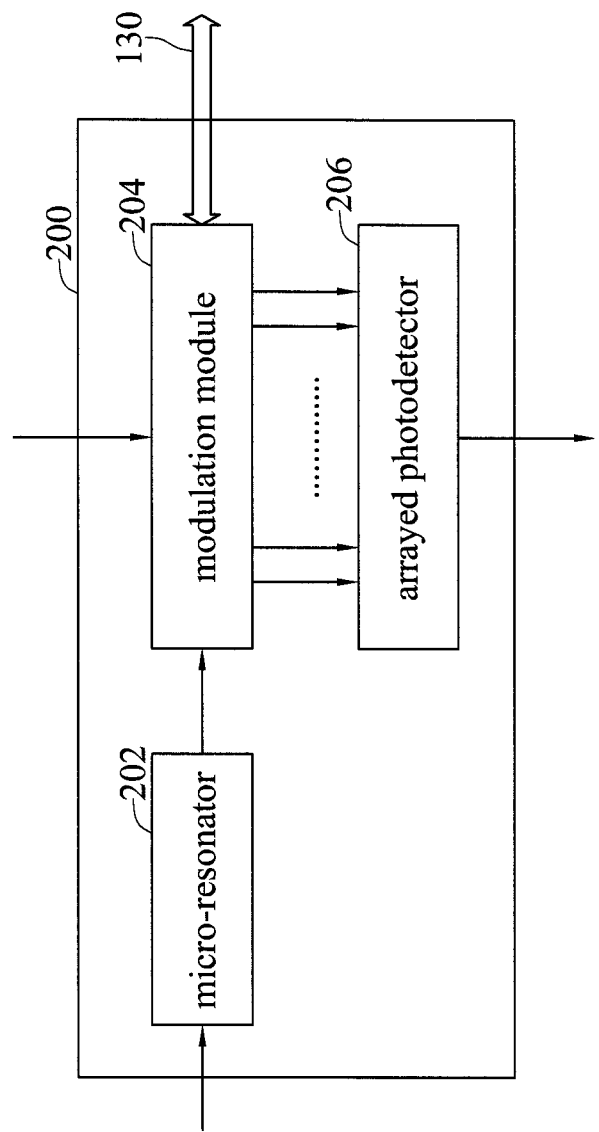
FIG. 2 is a circuit block diagram of an optical signal generating chip in accordance with an embodiment of the disclosure.

FIG. 2 is a circuit block diagram of an optical signal generating chip 200 in accordance with an embodiment of the disclosure. The optical signal generating chip 200 may be the first optical signal generating chip 118 shown in FIG. 1. The optical signal generating chip 200 may be the second optical signal generating chip 128 shown in FIG. 1. The optical signal generating chip 200 includes a micro-resonator 202, a modulation module 204, and an arrayed photodetector 206. The micro-resonator 202 is coupled to the modulation module 204. If the optical signal generating chip 200 is the first optical signal generating chip 118 shown in FIG. 1, the micro-resonator 202 is also coupled to the first optical amplifier 116. If the optical signal generating chip 200 is the second optical signal generating chip 128 shown in FIG. 1, the micro-resonator 202 is also coupled to the second optical amplifier 126. The modulation module 204 is coupled to the micro-resonator 202 and the arrayed photodetector 206. The arrayed photodetector 206 is coupled to the modulation module 204. It is noted that the arrayed photodetector 206 may be inside the optical signal generating chip 200 or outside the optical signal generating chip 200. The arrayed photodetector 206 may be in the head-end unit 110 shown in FIG. 1. The arrayed photodetector 206 may be in the remote access unit 120 shown in FIG. 1. The arrayed photodetector 206, for example, is an arrayed photodiode which converts a plurality of optical signals into a plurality of electrical signals. The electrical signals, for example, are currents or voltages. The micro-resonator 202 may be circular or elliptical. The micro-resonator 202 may be a resonant cavity. In an embodiment, a multi-wavelength frequency comb may be generated in the resonant cavity by controlling the characteristic of the length of the resonant cavity.

Figure 3:
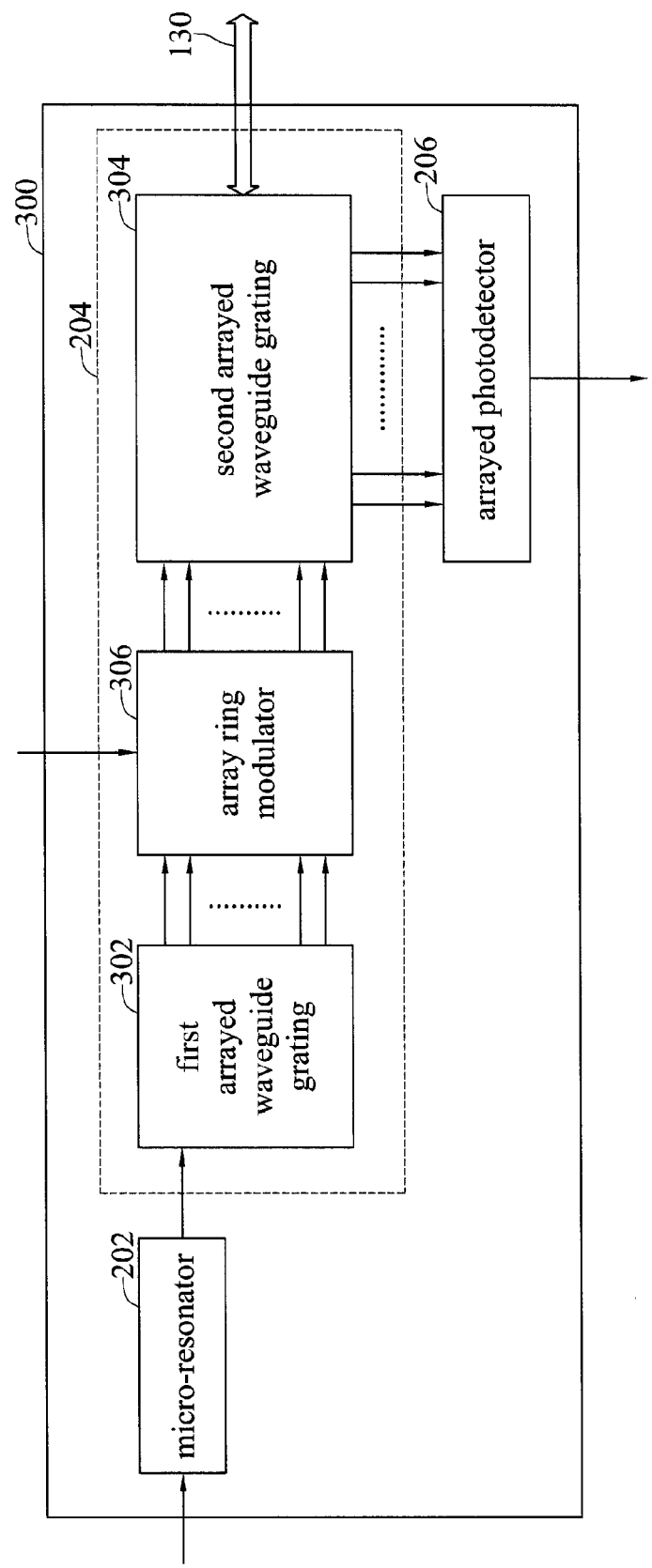
FIG. 3 is a circuit block diagram of the optical signal generating chip in accordance with another embodiment of the disclosure.

FIG. 3 is a circuit block diagram of the optical signal generating chip 300 in accordance with another embodiment of the disclosure. The optical signal generating chip 300 may be the first optical signal generating chip 118 shown in FIG. 1. The optical signal generating chip 300 may be the second optical signal generating chip 128 shown in FIG. 1. The optical signal generating chip 300 includes the micro-resonator 202, the modulation module 204, and the arrayed photodetector 206. The modulation module 204 includes a first arrayed waveguide grating (AWG) 302, an array ring modulator 306, and a second arrayed waveguide grating 304. The first arrayed waveguide grating 302 is coupled to the micro-resonator 202 and the array ring modulator 306. The array ring modulator 306 is coupled to the first arrayed waveguide grating 302 and the second arrayed waveguide grating 304. The second arrayed waveguide grating 304 is coupled to the array ring modulator 306 and the arrayed photodetector 206. The arrayed photodetector 206 is coupled to the second arrayed waveguide grating 304. The first arrayed waveguide grating 302 may divide a frequency comb into a plurality of optical signals with different wavelength channels. The second arrayed waveguide grating 304 may integrate a plurality of optical signals with different wavelength channels and send the integrated optical signals to a single optical fiber. Also, the second arrayed waveguide grating 304 may divide an optical communication signal received from the optical fiber into a plurality of optical signals with different wavelength channels. The first arrayed waveguide grating 302 may be a demultiplexer of the frequency comb, and the second arrayed waveguide grating 304 may be a multiplexer of a plurality of optical signals with different wavelength or a demultiplexer of a signal with multiple wavelengths. It is noted that the arrayed photodetector 206 may be inside the optical signal generating chip 300 or outside the optical signal generating chip 300. For example, the arrayed photodetector 206 may be inside the head-end unit 110 shown in FIG. 1 or may be inside the remote access unit 120 shown in FIG. 1. The modulation module 204, in this embodiment, includes the first arrayed waveguide grating 302, the array ring modulator 306, and the second arrayed waveguide grating 304. In another embodiment, the modulation module 204 may be implemented by the array ring modulator 306, and the modulation module 204 may be not include the first arrayed waveguide grating 302 or the second arrayed waveguide grating 304. In one embodiment, using the first arrayed waveguide grating 302 and the second arrayed waveguide grating 304 may improve the filtering effects of the optical signal.

Figure 4A:
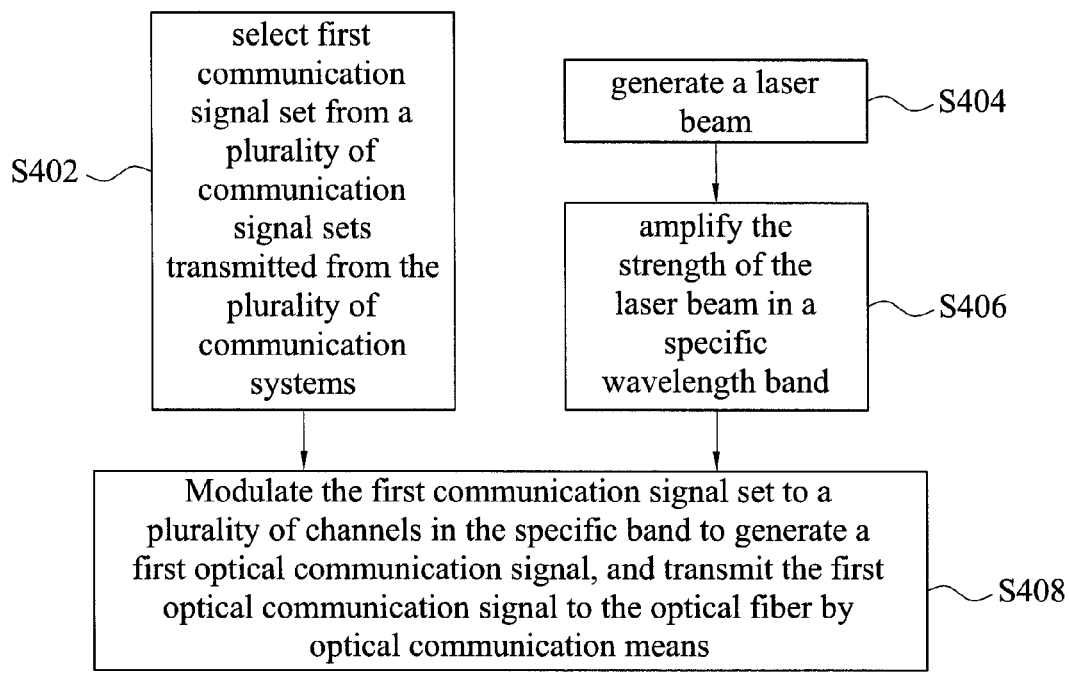
FIGS. 4A-4D are operation flows of the optical communication system in accordance with an embodiment of the disclosure.

FIGS. 4A-4D are operation flows of the optical communication system 100 in accordance with an embodiment of the disclosure. Referring to FIGS. 1-4D, this embodiment describes a flow by which a signal is transmitted from at least one of a plurality of communication systems 150 to a remote device (not shown). The remote device, for example, may be a mobiles device such as a mobile phone. In this embodiment, the plurality of communication systems 150 include a communication system 152, a communication system 154, and a communication system 156. In another embodiment, the plurality of communication systems 150 may include two or more communication systems. The communication system 152, for example, is Worldwide Interoperability for Microwave Access (WiMAX). The communication system 154, for example, is Time Division Long Term Evolution (TD-LTE). The communication system 156, for example, is wireless local area network (WLAN). The communication systems are not limited to the systems illustrated above. A signal may be transmitted from a base station of at least one of the communication system 152, the communication system 154, or the communication system 156 to the remote device. The signals transmitted from the communication system 152, from the communication system 154, and from the communication system 156, for example, are a first communication signal set, a second communication signal set, and a third communication signal set separately. Each of the communication signal sets may include a plurality of communication signals (for example, 12 communication signals). FIG. 4A is an operation flow of the head-end unit 110. In this embodiment, the first communication signal set is taken as an example, but the disclosure is not limited thereto. At first, in step S402, the MUX-DEMUX 112 selects the first communication signal set from a plurality of communication signal sets transmitted from the plurality of communication systems 150. In step S404, the first laser source 114 generates a laser beam. In step S406, the first optical amplifier 116 amplifies the light intensity of the laser beam in a specific wavelength band. The specific wavelength band, for example, is a wavelength band for optical communication such as a band from 800 nm (nanometer) to 1700 nm. Then, in step S408, the first optical signal generating chip 118 modulates the first communication signal set to a plurality of channels in the specific band to generate a first optical communication signal, and transmits the first optical communication signal to the optical fiber 130 by optical communication means. It is noted that although the optical fiber 130 is the medium for the transmission of the optical signals in this embodiment, the disclosure is not limited thereto. Any medium which could be used to deliver optical signals may be used as the transmission medium.

Figure 4B:
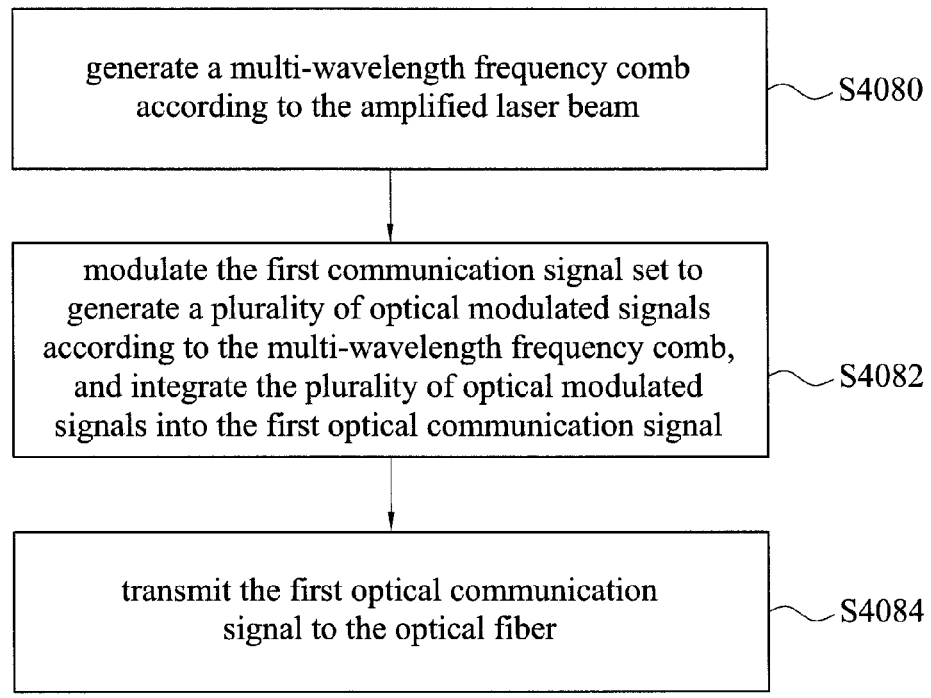

FIG. 4B is an operation flow of the first optical signal generating chip 118 in the head-end unit 110 in accordance with an embodiment of the disclosure, and is a detailed operation flow of step S408 in FIG. 4A in accordance with an embodiment of the disclosure. Refer to FIGS. 1, 2 and 4B. In step S4080, the micro-resonator 202 generates a multi-wavelength frequency comb according to the amplified laser beam. The multi-wavelength, for example, includes 12 wavelength channels. For example, the wavelengths in the 12 channels are 1550 nm, 1550.8 nm, 1551.6 nm, 1552.4 nm, 1553.2 nm, 1554 nm, 1554.8 nm, 1555.6 nm, 1556.4 nm, 1557.2 nm, 1558 nm, and 1558.8 nm. Though the disclosure is not limited thereto. Then, in step S4082, the modulation module 204 modulates the first communication signal set to generate a plurality of optical modulated signals according to the multi-wavelength frequency comb. For example, the modulation module 204 modulates the plurality of communication signals of the first communication signal set to the frequencies of the channels of the multi-wavelength frequency comb. The modulation module 204 also integrates the plurality of optical modulated signals into the first optical communication signal. For example, the modulation module 204 integrates the plurality of optical modulated signals to generate the first optical communication signal by multiplexing. Then, in step S4084, the head-end unit 110 transmits the first optical communication signal to the optical fiber 130.

Figure 4C:
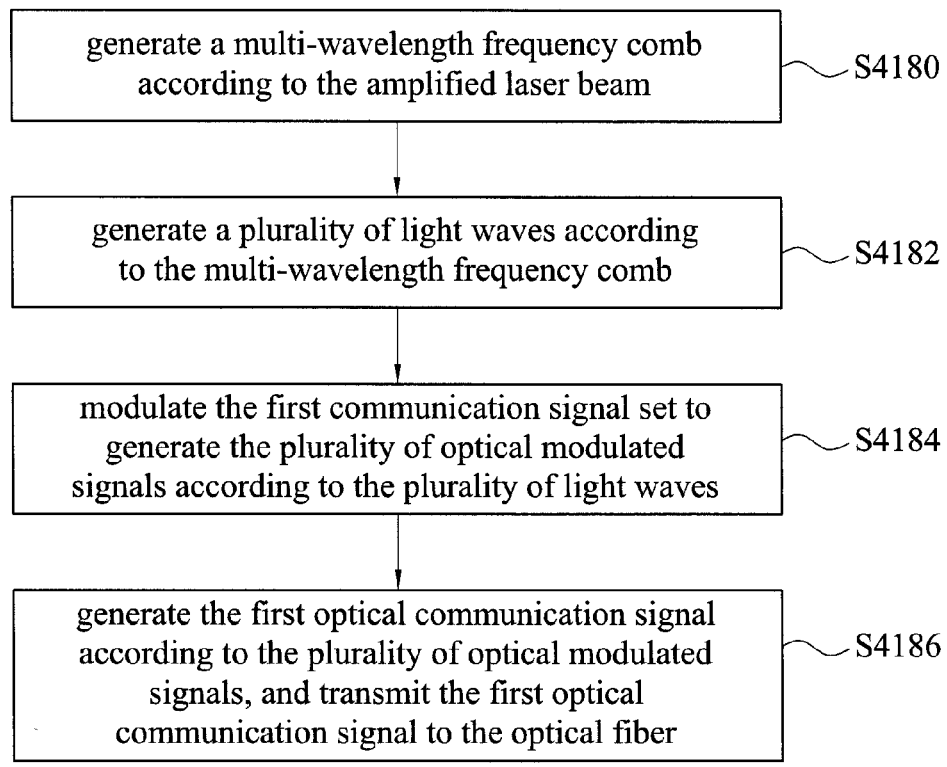

FIG. 4C is an operation flow of the first optical signal generating chip 118 in the head-end unit 110 in accordance with another embodiment of the disclosure, and is a detailed operation flow of step S408 in FIG. 4A in accordance with another embodiment of the disclosure. Refer to FIGS. 1, 3 and 4C. In step S4180, the micro-resonator 202 generates a multi-wavelength frequency comb according to the amplified laser beam. The multi-wavelength, for example, includes 12 wavelength channels. For example, the wavelengths in the 12 channels are 1550 nm, 1550.8 nm, 1551.6 nm, 1552.4 nm, 1553.2 nm, 1554 nm, 1554.8 nm, 1555.6 nm, 1556.4 nm, 1557.2 nm, 1558 nm, and 1558.8 nm. Though the disclosure is not limited thereto. Then, in step S4182, the first arrayed waveguide grating 302 generates a plurality of light waves according to the multi-wavelength frequency comb. Each of the plurality of light waves includes a wavelength or a wavelength band. The plurality of light waves, for example, are 12 channels, each of which includes a wavelength. The first arrayed waveguide grating 302 may filter the multi-wavelength frequency comb to generate the plurality of light waves in a plurality of specific frequencies. Then, in step S4184, the array ring modulator 306 modulates the first communication signal set to generate the plurality of optical modulated signals according to the plurality of light waves. For example, the array ring modulator 306 modulates the plurality of communication signals of the first communication signal set to the frequencies of the plurality of light waves. Then, in step S4186, the second arrayed waveguide grating 304 generates the first optical communication signal according to the plurality of optical modulated signals. For example, the second arrayed waveguide grating 304 integrates the plurality of optical modulated signals to the first optical communication signal by multiplexing. And then, the head-end unit 110 transmits the first optical communication signal to the optical fiber 130.

Figure 4D:
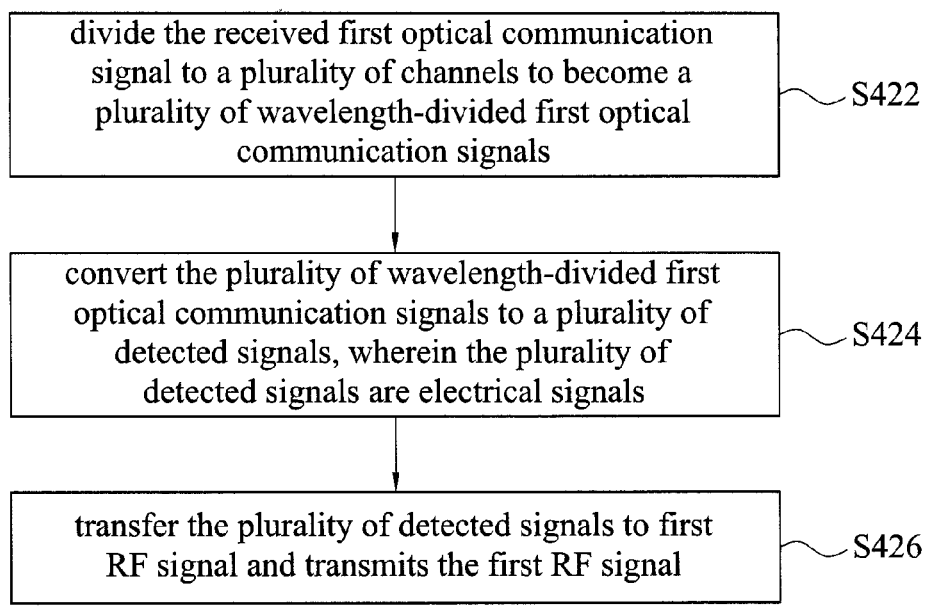

FIG. 4D is an operation flow of the remote access unit 120. Refer to FIGS. 1, 2, 3 and 4D. After the head-end unit 110 transmits the first optical communication signal to the optical fiber 130, the first optical communication signal is transmitted to the remote access unit 120 through the optical fiber 130. Then, in step S422, the modulation module 204 in the second optical signal generating chip 128 divides the received first optical communication signal to a plurality of channels to become a plurality of wavelength-divided first optical communication signals. Each of the plurality of wavelength-divided first optical communication signals may be in a wavelength or a wavelength band. This step may be performed in the second arrayed waveguide grating 304 or in the array ring modulator 306 in the modulation module 204. Then in step S424, the arrayed photodetector 206 detects the plurality of wavelength-divided first optical communication signals and converts the optical signals to electrical signals, such that the arrayed photodetector 206 converts the plurality of wavelength-divided first optical communication signals to a plurality of detected signals, wherein the plurality of detected signals are electrical signals. Then, in step S426, the RF module 122 converts the plurality of detected signals to RF signals to become a first RF signal and an antenna 140 transmits the first RF signal to the remote device.

Figure 5A:
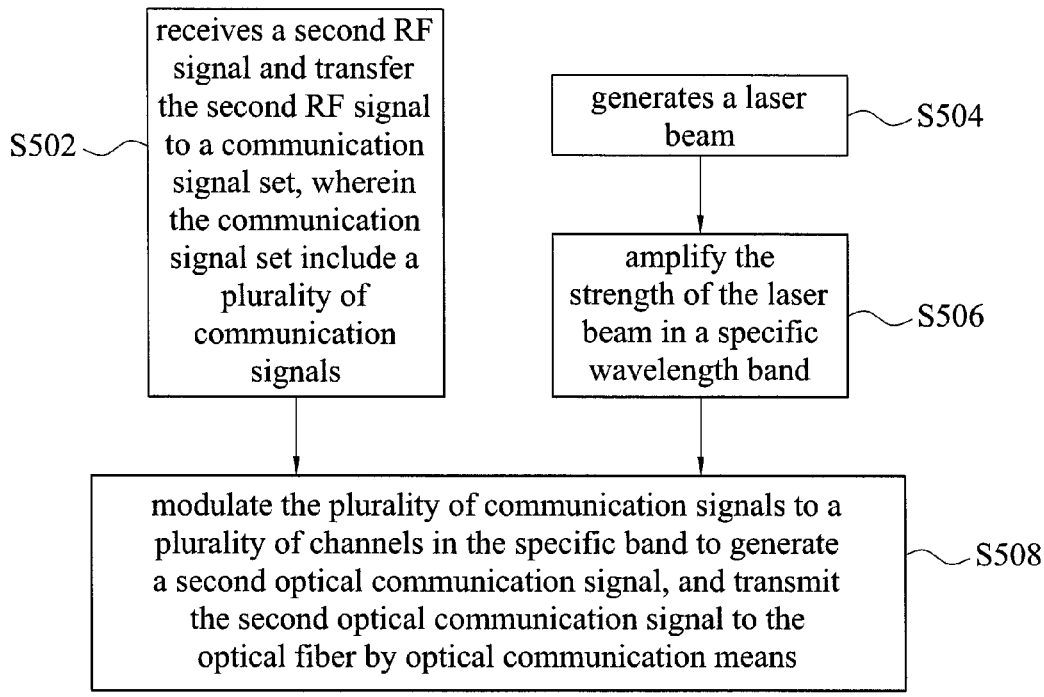
FIGS. 5A-5D are operation flows of the optical communication system in accordance with another embodiment of the disclosure.

FIGS. 5A-5D is an operation flow of the optical communication system 100 in accordance with another embodiment of the disclosure. Refer to FIGS. 1, 2, 3 and 5. This embodiment explains a flow of the signal transmitted from a remote device (not shown) to at least one communication system of the plurality of communication systems 150. FIG. 5A is an operation flow of the remote access unit 120. After the antenna 140 receives the signals from the remote device, at first, in step S502, the RF module 122 receives a second RF signal and converts the second RF signal to a communication signal set. The communication signal set may include a plurality of communication signals. For example, the communication signal set includes 12 channels of communication signals. In step S504, the second laser source 124 generates a laser beam. The second optical amplifier 126 amplifies the light intensity of the laser beam in a specific wavelength band in step S506. The specific wavelength band, for example, is a wavelength band for optical communication such as a band from 800 nm to 1700 nm. Then, in step S508, the second optical signal generating chip 128 modulates the plurality of communication signals to a plurality of channels in the specific band to generate a second optical communication signal, and transmits the second optical communication signal to the optical fiber 130 by optical communication means. It is noted that although the optical fiber 130 is the medium for the transmission of the optical signals in this embodiment, the disclosure is not limited thereto. Any medium which could be used to deliver optical signals may be used as the transmission medium.

Figure 5B:
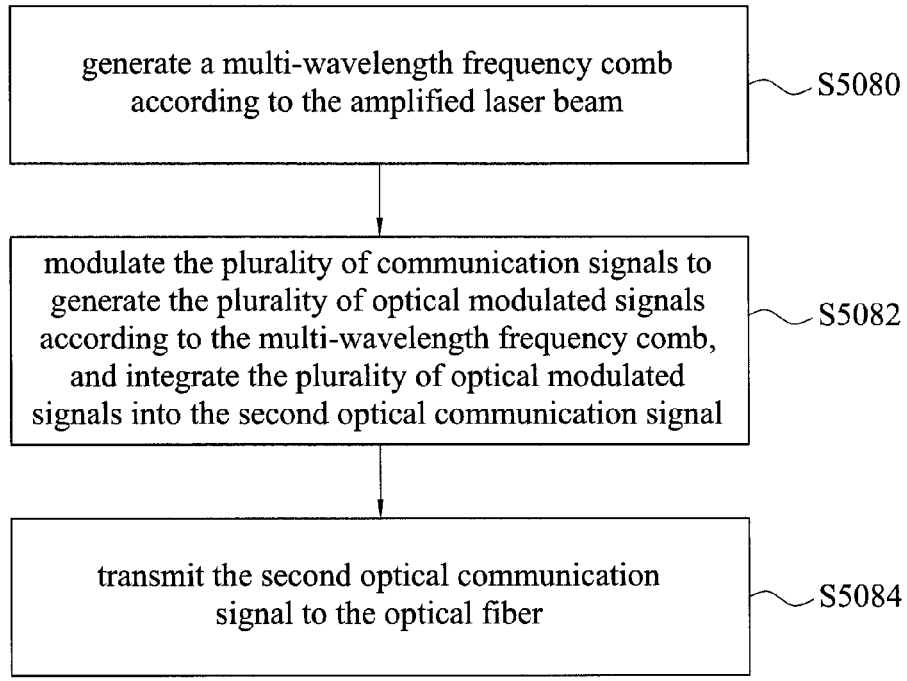

FIG. 5B is an operation flow of the second optical signal generating chip 128 in the remote access unit 120 in accordance with an embodiment of the disclosure, and is a detailed operation flow of step S508 in FIG. 5A in accordance with an embodiment of the disclosure. Referring to FIGS. 1, 2 and 5B, in step S5080, the micro-resonator 202 generates a multi-wavelength frequency comb according to the amplified laser beam. The multi-wavelength, for example, includes 12 wavelength channels. For example, the wavelengths in the 12 channels are 1550 nm, 1550.8 nm, 1551.6 nm, 1552.4 nm, 1553.2 nm, 1554 nm, 1554.8 nm, 1555.6 nm, 1556.4 nm, 1557.2 nm, 1558 nm, and 1558.8 nm. Though the disclosure is not limited thereto. Then in step S5082, the modulation module 204 modulates the plurality of communication signals to generate the plurality of optical modulated signals according to the multi-wavelength frequency comb. For example, the modulation module 204 modulates the plurality of communication signals to the frequencies of the channels of the multi-wavelength frequency comb. The modulation module 204 also integrates the plurality of optical modulated signals into the second optical communication signal. For example, the modulation module 204 integrates the plurality of optical modulated signals to generate the second optical communication signal by multiplexing. Then, in step S5084, the remote access unit 120 transmits the second optical communication signal to the optical fiber 130.

Figure 5C:
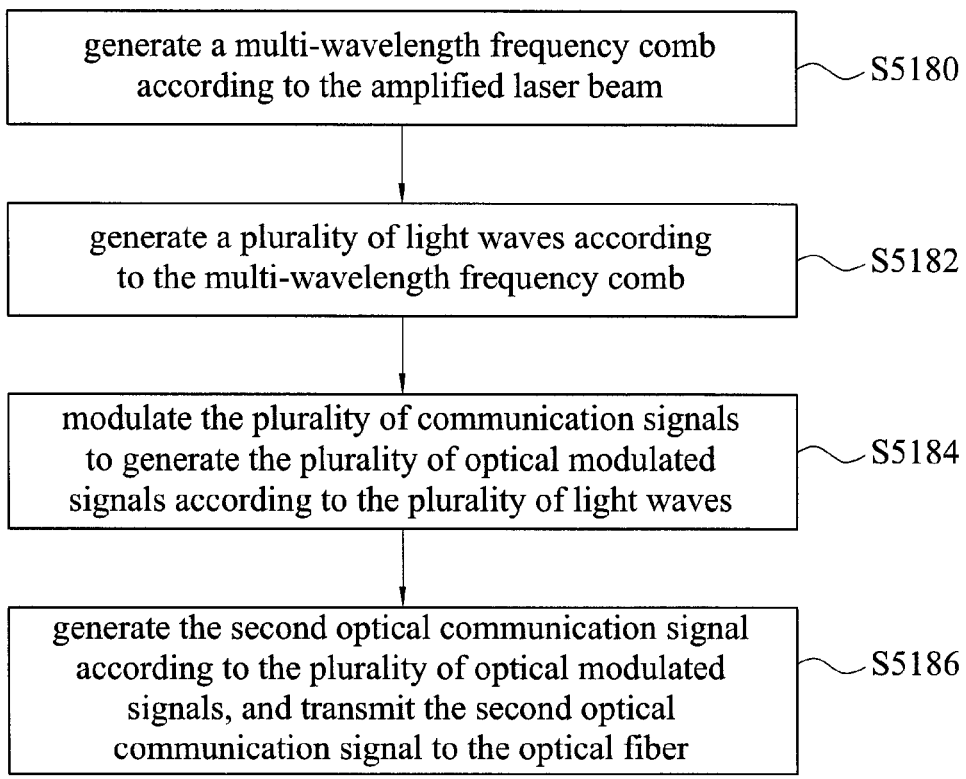

FIG. 5C is an operation flow of the second optical signal generating chip 128 in the remote access unit 120 in accordance with another embodiment of the disclosure, and is a detailed operation flow of step S508 in FIG. 5A in accordance with another embodiment of the disclosure. Refer to FIGS. 1, 3 and 5C. In step S5180, the micro-resonator 202 generates a multi-wavelength frequency comb according to the amplified laser beam. The multi-wavelength, for example, includes 12 wavelength channels. For example, the wavelengths in the 12 channels are 1550 nm, 1550.8 nm, 1551.6 nm, 1552.4 nm, 1553.2 nm, 1554 nm, 1554.8 nm, 1555.6 nm, 1556.4 nm, 1557.2 nm, 1558 nm, and 1558.8 nm. Though the disclosure is not limited thereto. Then, in step S5182, the first arrayed waveguide grating 302 generates a plurality of light waves according to the multi-wavelength frequency comb. Each of the plurality of light waves includes a wavelength or a wavelength band. The plurality of light waves, for example, are 12 channels, each of which includes a wavelength. The first arrayed waveguide grating 302 may filter the multi-wavelength frequency comb to generate the plurality of light waves in specific plurality of frequencies. Then, in step S5184, the array ring modulator 306 modulates the plurality of communication signals to generate the plurality of optical modulated signals according to the plurality of light waves. For example, the array ring modulator 306 modulates the plurality of communication signals to the frequencies of the plurality of light waves. Then, in step S5186, the second arrayed waveguide grating 304 generates the second optical communication signal according to the plurality of optical modulated signals. For example, the second arrayed waveguide grating 304 integrates the plurality of optical modulated signals to the second optical communication signal by multiplexing. And then, the remote access unit 120 transmits the second optical communication signal to the optical fiber 130.

Figure 5D:
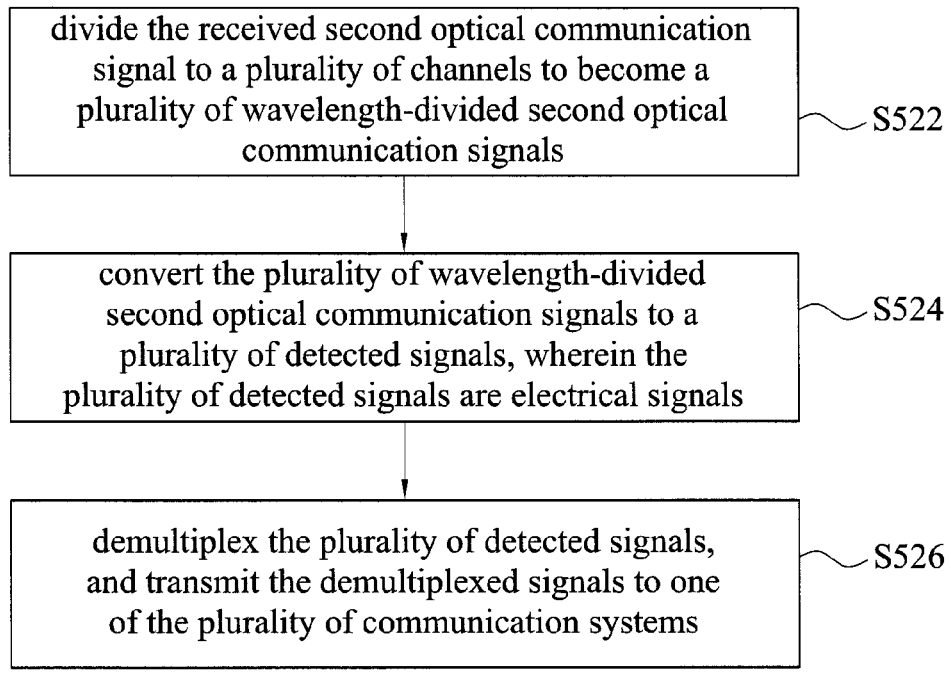

FIG. 5D is an operation flow of the head-end unit 110. Refer to FIGS. 1, 2, 3 and 5D. The remote access unit 120 transmits the second optical communication signal to the optical fiber 130, and the second optical communication signal is transmitted to the head-end unit 110 through the optical fiber 130. Then, in step S522, according to the wavelengths, the modulation module 204 in the first optical signal generating chip 118 divides the received second optical communication signal to a plurality of channels to become a plurality of wavelength-divided second optical communication signals. Each of the plurality of wavelength-divided second optical communication signals may be in a wavelength or a wavelength band. This step may be performed in the second arrayed waveguide grating 304 or in the array ring modulator 306 in the modulation module 204. Then in step S524, the arrayed photodetector 206 detects the plurality of wavelength-divided second optical communication signals and converts the optical signals to electrical signals, such that the arrayed photodetector 206 converts the plurality of wavelength-divided second optical communication signals into a plurality of detected signals, wherein the plurality of detected signals are electrical signals. Then, in step S526, after the MUX-DEMUX 112 demultiplexes the plurality of detected signals, the head-end unit 110 transmits the demultiplexed signals to one of the plurality of communication systems 150.

In the disclosure, a plurality of laser sources are replaced by a frequency comb generated by a laser source such that the number of light sources may be decreased when interfacing a plurality of communication systems. The number of components, the space, and the cost may be further decreased if the silicon manufacturing process and back-end integrated technology are used.

Although the disclosure is disclosed by the embodiments as described above. However, it is not to limit the disclosure. Any person having ordinary skill in the art may do modifications and variations without departing from the spirits or scope of the disclosure. Thus, it is intended that the scope of the disclosure is indicated by the following claims and their equivalents.

The invention claimed is:
1. An optical communication device, comprising:
a laser source for generating a laser beam;
an optical amplifier coupled to the laser source for amplifying light intensity of the laser beam in a specific wavelength band; and
an optical signal generating chip, comprising:
　a micro-resonator coupled to the optical amplifier for generating a multi-wavelength frequency comb according to the amplified laser beam; and
　a modulation module coupled to the micro-resonator for modulating a communication signal set to generate a plurality of optical modulated signals according to the multi-wavelength frequency comb, wherein the communication signal set comprises a plurality of communication signals, and wherein the modulation module comprises:
　　a first arrayed waveguide grating for generating a plurality of light waves according to the multi-wavelength frequency comb, wherein each of the plurality of light waves comprises a wavelength or a wavelength band;
　　an array ring modulator for modulating the communication signal set to generate the plurality of optical modulated signals according to the plurality of light waves; and
　　a second arrayed waveguide grating for integrating the plurality of optical modulated signals to a first optical communication signal.
2. The optical communication device of claim 1, wherein the micro-resonator is circular or elliptical.

3. An optical communication device, comprising:
a laser source for generating a laser beam;
an optical amplifier coupled to the laser source for amplifying light intensity of the laser beam in a specific wavelength band; and
an optical signal generating chip, comprising:
a micro-resonator coupled to the optical amplifier for generating a multi-wavelength frequency comb according to the amplified laser beam; and
a modulation module coupled to the micro-resonator for modulating a communication signal set to generate a plurality of optical modulated signals according to the multi-wavelength frequency comb, wherein the communication signal set comprises a plurality of communication signals,
wherein the optical signal generating chip further comprises an arrayed photodetector, the modulation module further divides a second optical communication signal to a plurality of channels according to wavelengths to become a plurality of wavelength-divided second optical communication signals, and the arrayed photodetector converts the plurality of wavelength-divided second optical communication signals into a plurality of detected signals that are electrical signals.

4. The optical communication device of claim 3, further comprising a multiplexer-demultiplexer (MUX-DEMUX) coupled to the optical signal generating chip for selecting the communication signal set from a plurality of communication signal sets transmitted from a plurality of communication systems, wherein each of the plurality of communication signal sets comprises a plurality of communication signals.

5. The optical communication device of claim 4, the MUX-DEMUX further demultiplexes the plurality of detected signals, and the optical communication device further transmits the demultiplexed plurality of detected signals to one of the plurality of communication systems.

6. The optical communication device of claim 3, further comprising a radio frequency (RF) module coupled to the optical signal generating chip and receiving and converting a second RF signal to the communication signal set.

7. The optical communication device of claim 6, the RF module further converts the plurality of detected signals to a first RF signal, and transmits the first RF signal.

8. The optical communication device of claim 1, wherein the multi-wavelength frequency comb is generated in a resonant cavity by controlling a characteristic of a length of a resonant cavity.

9. An optical communication method, applicable to an optical communication device, the method comprising:
generating a laser beam;
amplifying light intensity of the laser beam in a specific wavelength band;
generating a multi-wavelength frequency comb by an optical signal generating chip according to the amplified laser beam, wherein the optical signal generating chip is inside the optical communication device; and
modulating a communication signal set to generate a plurality of optical modulated signals by the optical signal generating chip according to the multi-wavelength frequency comb, wherein the communication signal set comprises a plurality of communication signals, wherein modulating the communication signal set to generate the plurality of optical modulated signals by the optical signal generating chip according to the multi-wavelength frequency comb comprises:
generating a plurality of light waves, by a first arrayed waveguide grating, according to the multi-wavelength frequency comb, wherein each of the plurality of light waves comprises a wavelength or a wavelength band;
modulating the communication signal set, by an array ring modulator, to generate the plurality of optical modulated signals according to the plurality of light waves; and
integrating the plurality of optical modulated signals, by a second arrayed waveguide grating, to a first optical communication signal.

10. The optical communication method of claim 9, further comprising:
integrating, by the optical signal generating chip, the plurality of optical modulated signals into a first optical communication signal; and
transmitting the first optical communication signal to an optical fiber.

11. An optical communication method, applicable to an optical communication device, the method comprising:
generating a laser beam;
amplifying light intensity of the laser beam in a specific wavelength band;
generating a multi-wavelength frequency comb by an optical signal generating chip according to the amplified laser beam, wherein the optical signal generating chip is inside the optical communication device, and wherein the optical signal generating chip comprises an arrayed photodetector;
modulating a communication signal set, by a modulation module in the optical signal generating chip, to generate a plurality of optical modulated signals according to the multi-wavelength frequency comb, wherein the communication signal set comprises a plurality of communication signals;
dividing a second optical communication signal, by the modulation module, to a plurality of channels according to wavelengths to become a plurality of wavelength-divided second optical communication signals; and
converting the plurality of wavelength-divided second optical communication signals, by the arrayed photodetector, into a plurality of detected signals that are electrical signals.

12. The optical communication method of claim 11, further comprising selecting the communication signal set from a plurality of communication signal sets transmitted from a plurality of communication systems, wherein each of the plurality of communication signal sets comprises a plurality of communication signals.

13. The optical communication method of claim 12, further comprising demultiplexing the plurality of detected signals, and transmitting the demultiplexed plurality of detected signals to one of the plurality of communication systems.

14. The optical communication method of claim 11, further comprising receiving a second RF signal, and converting the second RF signal to the communication signal set.

15. The optical communication method of claim 11, further comprising converting the plurality of detected signals to a first RF signal, and transmitting the first RF signal.

16. The optical communication method of claim 9, wherein the multi-wavelength frequency comb is generated in a resonant cavity by controlling a characteristic of a length of a resonant cavity.

* * * * *